United States Patent
Ono (10) Patent No.: US 9,734,547 B2
(45) Date of Patent: Aug. 15, 2017

(54) INFORMATION PROCESSING DEVICE FOR CONTROLLING AN ORDER OF DISPLAYING IMAGES IN A SINGLE LAYER AND INFORMATION PROCESSING METHOD IMPLEMENTING THE SAME

(71) Applicant: Zentaroh Ono, Tokyo (JP)

(72) Inventor: Zentaroh Ono, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 160 days.

(21) Appl. No.: 14/662,428

(22) Filed: Mar. 19, 2015

(65) Prior Publication Data
US 2015/0278982 A1     Oct. 1, 2015

(30) Foreign Application Priority Data
Mar. 27, 2014    (JP) ................ 2014-065523

(51) Int. Cl.
| | |
|---|---|
| *G06T 1/20* | (2006.01) |
| *G06F 21/84* | (2013.01) |
| *G06T 1/60* | (2006.01) |
| *G06F 3/14* | (2006.01) |
| *G09G 5/14* | (2006.01) |

(52) U.S. Cl.
CPC ............... *G06T 1/20* (2013.01); *G06F 3/14* (2013.01); *G06F 21/84* (2013.01); *G06T 1/60* (2013.01); *G09G 5/14* (2013.01); *G09G 2340/14* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2010/0110480 A1* | 5/2010 | Satake | ............... | G06F 9/4443 358/1.15 |
| 2011/0181521 A1* | 7/2011 | Reid | ............... | G06F 3/0483 345/173 |

FOREIGN PATENT DOCUMENTS

| | | |
|---|---|---|
| JP | 2011-138529 | 7/2011 |
| JP | 2011138529 | * 7/2011 |
| JP | 2011-186767 | 9/2011 |

* cited by examiner

*Primary Examiner* — Vu Nguyen
(74) *Attorney, Agent, or Firm* — Harness, Dickey & Pierce, P.L.C.

(57) ABSTRACT

An information processing device includes a layer structure including one or more layers for displaying display information. The information processing device includes a storage unit configured to store, in a predetermined storage area, a priority level included in a request, when the request to display the display information in one of the layers included in the layer structure is received; a determining unit configured to determine whether to display, on the one of the layers, the display information corresponding to the request, based on the priority level stored in the predetermined storage area; and a display unit configured to display the display information on the one of the layers, when the determining unit determines to display, on the one of the layers, the display information corresponding to the request.

7 Claims, 6 Drawing Sheets

| REQUEST SOURCE ID | PRIORITY LEVEL |
|---|---|
| A | 60 |
| C | 50 |
| D | 30 |
| E | 30 |

INFORMATION PROCESSING DEVICE FOR CONTROLLING AN ORDER OF DISPLAYING IMAGES IN A SINGLE LAYER AND INFORMATION PROCESSING METHOD IMPLEMENTING THE SAME

BACKGROUND OF THE INVENTION

1. Field of the Invention

The present invention relates to an information processing device and an information processing method.

2. Description of the Related Art

Conventionally, there is known a technology of displaying images by superposing an image over another image, on a display screen of an electronic device, etc. (see, for example, Patent Document 1).

However, by the above conventional technology, it is not possible to control the order of displaying images within a single layer. Therefore, when there are a plurality of images to be displayed on a single layer, the images can only be displayed in the order according to a display request with respect to this layer.

Patent Document 1: Japanese Laid-Open Patent Publication No. 2011-138529

SUMMARY OF THE INVENTION

The present invention provides an information processing device and an information processing method, in which one or more of the above-described disadvantages are eliminated.

According to an aspect of the present invention, there is provided an information processing device including a layer structure including one or more layers for displaying display information, the information processing device including a storage unit configured to store, in a predetermined storage area, a priority level included in a request, when the request to display the display information in one of the layers included in the layer structure is received; a determining unit configured to determine whether to display, on the one of the layers, the display information corresponding to the request, based on the priority level stored in the predetermined storage area; and a display unit configured to display the display information on the one of the layers, when the determining unit determines to display, on the one of the layers, the display information corresponding to the request.

According to an aspect of the present invention, there is provided an information processing method performed by an information processing device including a layer structure including one or more layers for displaying display information, the information processing method including storing, in a predetermined storage area, a priority level included in a request, when the request to display the display information in one of the layers included in the layer structure is received; determining whether to display, on the one of the layers, the display information corresponding to the request, based on the priority level stored in the predetermined storage area; and displaying the display information on the one of the layers, when the display information corresponding to the request is determined to be displayed on the one of the layers at the determining.

According to an aspect of the present invention, there is provided a non-transitory computer-readable recording medium storing a program implementing an information processing device including a layer structure including one or more layers for displaying display information, wherein the program causes a computer to execute a process including storing, in a predetermined storage area, a priority level included in a request, when the request to display the display information in one of the layers included in the layer structure is received; determining whether to display, on the one of the layers, the display information corresponding to the request, based on the priority level stored in the predetermined storage area; and displaying the display information on the one of the layers, when the display information corresponding to the request is determined to be displayed on the one of the layers at the determining.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given, with reference to the accompanying drawings, of embodiments of the present invention.

<Hardware Configuration of Image Processing Device>

Figure 1:
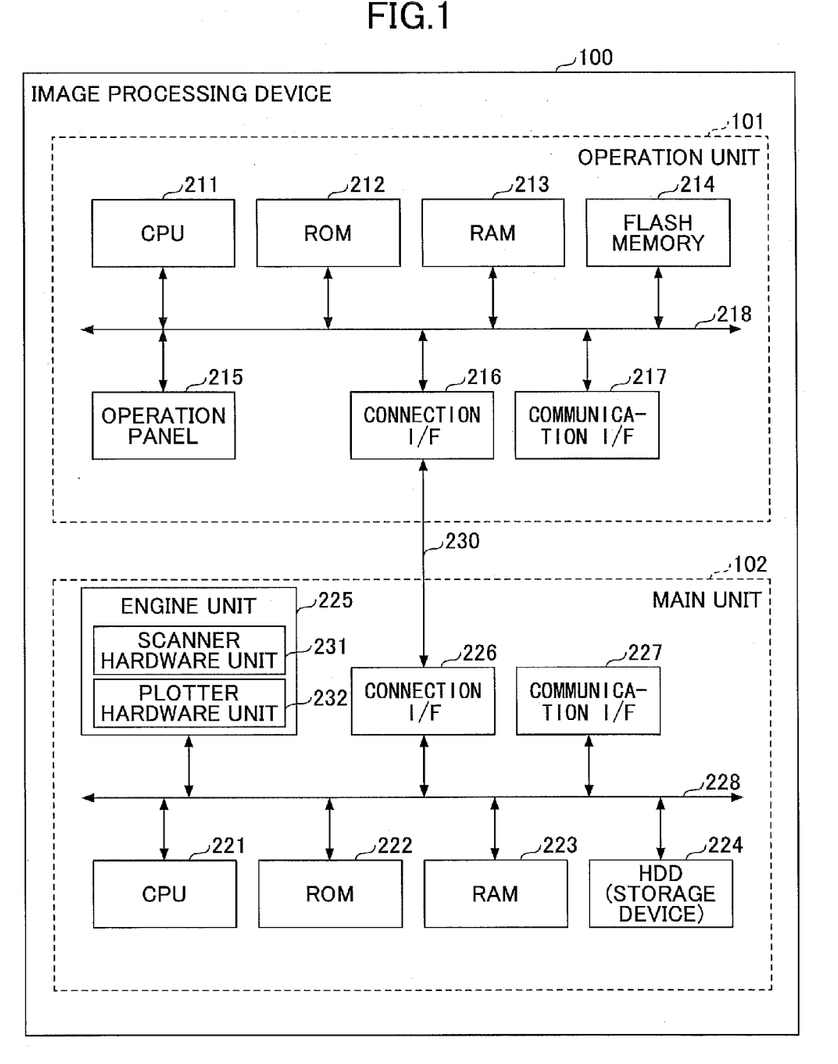
FIG. 1 illustrates an example of a hardware configuration of an operation unit and a main unit constituting an image processing device according to an embodiment.

First, a description is given of a hardware configuration of an image processing device 100 according to the present embodiment. FIG. 1 illustrates a hardware configuration of an operation unit and a main unit constituting the image processing device 100.

The image processing device 100 according to the present embodiment is an MFP (Multifunction Peripheral), and includes image processing functions such as a copy function, a scan function, a fax function, and a print function. Furthermore, the image processing device 100 includes various functions including functions relevant to image processing.

The image processing device 100 is constituted by an operation unit 101 and a main unit 102 as illustrated in FIG. 1. The image processing device 100 and the operation unit 101 are examples of an information processing device.

The operation unit 101 is used by the user for performing various operations, such as selecting an image processing function to be executed by the main unit 102, inputting various setting values for executing the image processing function, inputting an execution instruction to execute the image processing function, and switching the display screen.

The main unit 102 executes information processing for realizing various functions including the image processing functions and functions relevant to the image processing functions, based on various operations by the user made with respect to the operation unit 101.

As illustrated in FIG. 1, the operation unit 101 of the image processing device 100 includes a CPU (Central Processing Unit) 211, a ROM (Read Only Memory) 212, a RAM (Random Access Memory) 213, a flash memory 214, an operation panel 215, a connection I/F 216, and a communication I/F 217. The elements constituting the operation unit 101 are interconnected by a bus 218.

The CPU 211 controls the entire operation unit 101 by using the RAM 213 as a work area and executing various programs stored in the ROM 212 or the flash memory 214.

The flash memory 214 is a non-volatile storage medium, and stores various programs to be executed by the CPU 211 and various kinds of data.

The operation panel 215 is used by the user for performing various operations. Furthermore, the operation panel 215 displays the internal state of the image processing device 100. That is to say, for example, the operation panel 215 displays a GUI (Graphical User Interface) display screen used by the user for performing various operations with respect to various functions of the image processing device 100, and a display screen of internal information (an alert, an error, etc.) of the processing results by the image processing device 100. The GUI display screen and the display screen of internal information are displayed by a display function using a layer structure described below. For example, by using a layer structure, in a state where a GUI display screen of an application is displayed on the lower-level layer, an error display screen indicating internal information is displayed on a higher-level layer. Accordingly, the error display screen can be displayed by being superposed on the GUI display screen.

The connection I/F 216 is an interface for communicating with the main unit 102 via a communication path 230. As the connection I/F 216, for example, an interface of the USB (Universal Serial Bus) standard is used.

The communication I/F 217 is an interface for communicating with other information processing devices. As the communication I/F 217, for example, wireless LAN of the WiFi standard is used.

Similarly, the main unit 102 of the image processing device 100 includes a CPU 221, a ROM 222, a RAM 223, and a storage device 224 such as a HDD (Hard Disk Drive), an engine unit 225, a connection I/F 226, and a communication I/F 227. The elements constituting the main unit 102 are interconnected by a bus 228.

The CPU 221 controls the entire main unit 102 and realizes various functions, by using the RAM 223 as a work area and executing various programs stored in the ROM 222 or the storage device 224.

The storage device 224 is a non-volatile storage medium, and stores various programs to be executed by the CPU 221 and various kinds of data.

The engine unit 225 is a hardware element for performing information processing for realizing image processing functions such as a copy function, a scan function, a fax function, and a print function. The engine unit 225 includes, for example, a scanner hardware unit 231 for scanning an original document, and a plotter hardware unit 232 for printing onto a sheet material. Furthermore, the engine unit 225 may include a communication unit for performing fax communication, a finisher for sorting the sheets that have undergone printing, and an ADF (Auto Document Feeder) for automatically feeding original documents.

The connection I/F 226 is an interface for communicating with the operation unit 101 via the communication path 230. As the connection I/F 226, for example, an interface of the USB standard is used.

The communication I/F 227 is an interface for communicating with other information processing devices. As the connection I/F 227, for example, a wireless LAN of the WiFi standard is used.

Note that the above example, the image processing device 100 includes the operation unit 101; however, for example, an information processing terminal such as a tablet terminal, a smartphone, a mobile phone, and a PDA may function as the operation unit of the image processing device 100. That is to say, these information processing terminals may communicate with the image processing device 100 via the communication I/F 217 of the operation unit 101 or the communication I/F 227 of the main unit 102, and the user may be able to control the image processing device 100 by operating these information processing terminals.

Figure 2:
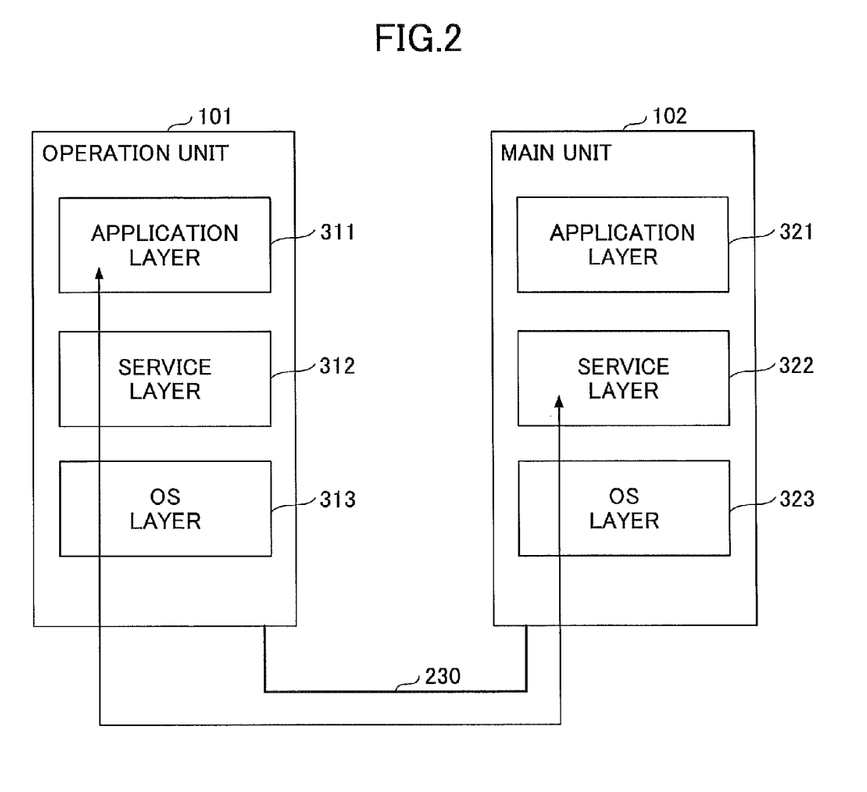
FIG. 2 illustrates an example of a hierarchical structure of a group of programs included in the operation unit and the main unit constituting the image processing device according to an embodiment.

Hierarchical Structure of Programs Included in operation Unit and Main Unit of Image Processing Device Next, a description is given of a hierarchical structure of a group of programs included in the operation unit 101 and the main unit 102 of the image processing device 100. FIG. 2 illustrates the hierarchical structure of a group of programs included in the operation unit 101 (ROM 212, flash memory 214) and the main unit 102 (ROM 222, storage device 224).

First, a description is given of the hierarchical structure of a group of programs included in the main unit 102 (ROM 222, storage device 224). The group of programs included in the main unit 102 are largely divided into an application layer 321, a service layer 322, and an OS layer 323. The programs classified in the application layer 321 are programs for realizing the image processing functions by causing the hardware resources to operate. Specifically, the programs include a copy application, a scan application, a fax application, and a print application.

The programs classified in the service layer 322 are programs interposed between the application layer 321 and the OS layer 323. These programs play a role of an interface for the programs of the application layer 321 to use the hardware resources provided in the main unit 102, and for reporting the state of the hardware resources provided in the main unit 102.

Specifically, the programs receive an operation request with respect to the hardware resources, and mediates the received operation request. Furthermore, the programs send an error detected in the hardware resources as error information. Note that an operation request received by the service layer 322 includes, for example, an operation request for scanning by the scanner hardware unit 231 or for printing by the plotter hardware unit 232.

Note that the role as an interface played by the programs classified in the service layer 322 is the same with respect to an application layer 311 of the operation unit 101. That is to say, the programs classified in the application layer 311 of the operation unit 101 can also realize image processing functions by accessing the service layer 322 and causing the hardware resources of the main unit 102 to operate.

The OS layer 323 is a program referred to as the basic software, which provides the basic function for controlling the hardware resources included in the main unit 102. The programs classified in the service layer 322 execute information processing for realizing an image processing function in response to an operation request made to the hardware resource, as a command of the operation request made to the hardware resource by a program classified in the application layer 321 is executed by a program classified in the OS layer 323. Furthermore, when a program classified in the OS layer 323 is executed, an error detected in the hardware resources is received, and this error is passed to the service layer 322 as error information.

Next, a description is given of the hierarchical structure of a group of programs included in the operation unit 101 (ROM 212, flash memory 214). Similar to the main unit 102, the group of programs included in the operation unit 101 can be largely divided into the application layer 311, a service layer 312, and an OS layer 313.

However, the functions provided by the programs classified in the application layer 311, and the types of operation requests that can be received by the service layer 312, are different from those of the main unit 102. The programs classified in the application layer 311 of the operation unit 101 mainly provide a user interface function for performing various operations and displaying information.

Note that in the present embodiment, the operation unit 101 and the main unit 102 are operated by separate OSs (Operating Systems). Furthermore, if the operation unit 101 and the main unit 102 can communicate with each other, the OSs do not need to be the same type. For example, the operation unit 101 may use Android (registered trademark) as the OS, and the main unit 102 may use Linux (registered trademark) as the OS.

As described above, in the image processing device 100, the operation unit 101 and the main unit 102 are controlled by different OSs, and therefore the communication between the operation unit 101 and the main unit 102 is not performed as inter-process communication within a single device, but as communication between different information processing devices.

The operation of sending, to the main unit 102, commands indicating various operations by the user received by the operation unit 101 (command communication), and the operation of sending an event instructing to display a display screen on the operation unit 101 by the main unit 102, correspond to examples of the above communication.

<Functional Configuration of Display Function>

Figure 3:
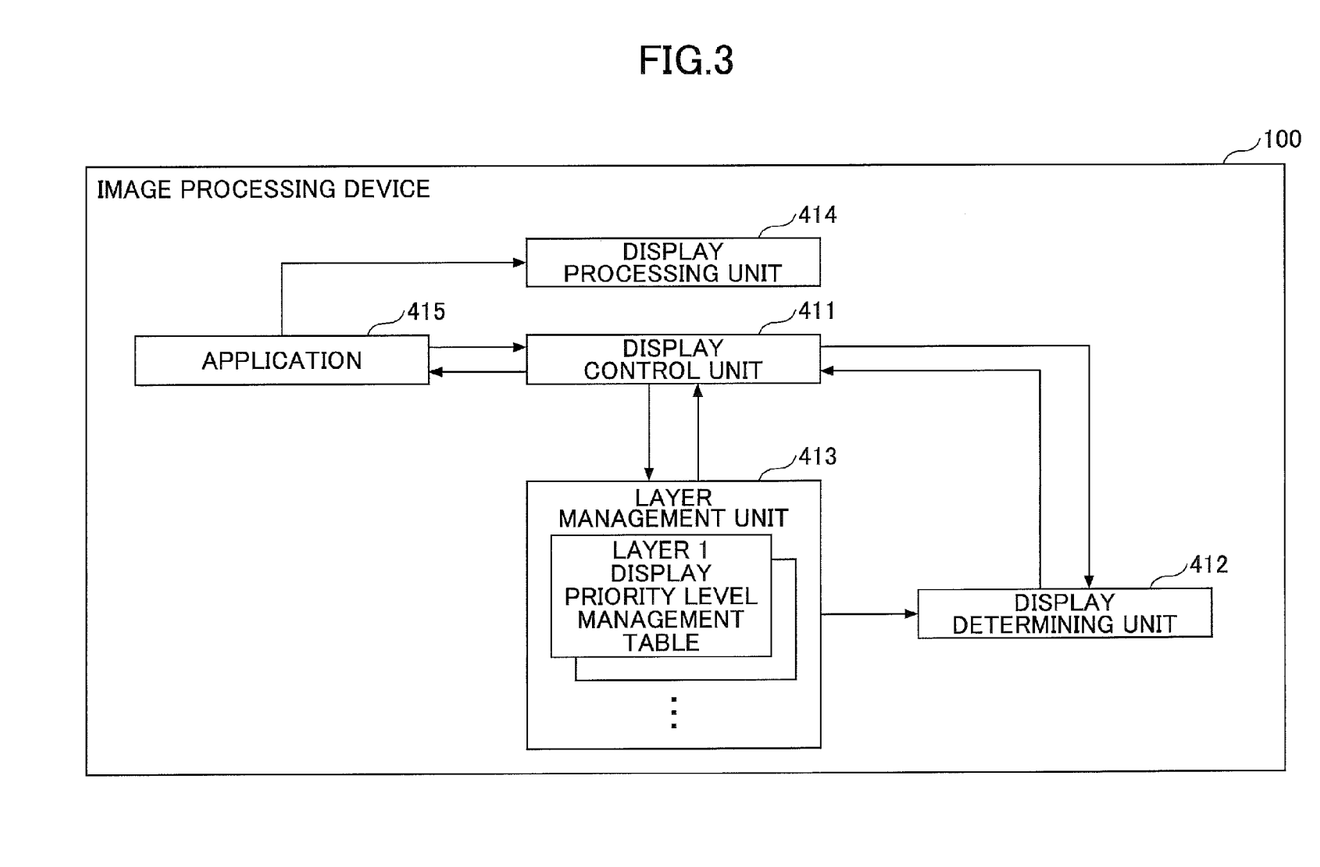
FIG. 3 illustrates an example of a functional configuration of the display function, among various functions realized by the group of programs of the image processing device according to an embodiment.

Next, a description is given of the functional configuration of the display function, among various functions realized by the group of programs in the operation unit 101 of the image processing device 100. FIG. 3 illustrates an example of a functional configuration of the display function, among various functions realized by the group of programs in the operation unit 101 of the image processing device 100.

With reference to FIG. 3, a description is given of the functional configuration of the operation unit 101 of the image processing device 100 for realizing a display function. As illustrated in FIG. 3, the operation unit 101 of the image processing device 100 includes, as functions for realizing the display function, a display control unit 411, a display determining unit 412, a layer management unit 413, and a display processing unit 414. Furthermore, the operation unit 101 of the image processing device 100 includes an application 415 that is a program classified in the application layer 311 described above.

The display control unit 411 requests other units to perform a process, based on a request from the application 415 and the OS (not illustrated). For example, when the display control unit 411 receives a predetermined request from the application 415, the display control unit 411 requests the layer management unit 413 to register predetermined information. Furthermore, the display control unit 411 requests the display determining unit 412 to determine whether to display the display information of the application 415. The display control unit 411 is realized by, for example, instructions from the CPU 211.

The display determining unit 412 determines whether to display the display information of, for example, the application 415 and the OS (not illustrated), in the same layer included in the layer structure, based on a request from the display control unit 411. The display determining unit 412 is realized by, for example, an instruction from the CPU 211. The layer management unit 413 stores a display priority level management table for determining whether to display the display information relevant to any of the requests, for each layer included in the layer structure. The layer management unit 413 is realized by, for example, instructions from the CPU 211 and the flash memory 214. The layer structure and the table configuration of the display priority level management table according to the present embodiment are described below.

The display processing unit 414 causes the operation panel 215 of the operation unit 101 to display a GUI display screen, etc., based on, for example, a display request from the application 415 and the OS (not illustrated). For example, the display processing unit 414 causes the operation panel 215 of the operation unit 101 to display a GUI display screen for executing various functions such as a copy function, based on a display request from the application 415. Furthermore, the display processing unit 414 causes the operation panel 215 of the operation unit 101 to display an alert display screen and an error display screen based on a display request from an OS (not illustrated). The display processing unit 414 is realized by, for example, instructions from the CPU 211 and the operation panel 215.

As described above, the application 415 is one or more programs that are classified in the application layer 311. The application 415 is a program for providing a user interface function for performing various operations and displaying information. For example, the application 415 provides a user interface for executing various functions such as a copy function, a scan function, a fax function, and a print function; and a user interface for making settings for these various functions. In the following, when the applications 415 are to be distinguished from each other, the applications 415 are expressed as application $415_1$, application $415_2$, . . . .

Here, a description is given of the layer structure of the operation unit 101 of the image processing device 100 and the display priority level management table stored in the layer management unit 413 according to the present embodiment.

<<Layer Structure>>

Figure 4:
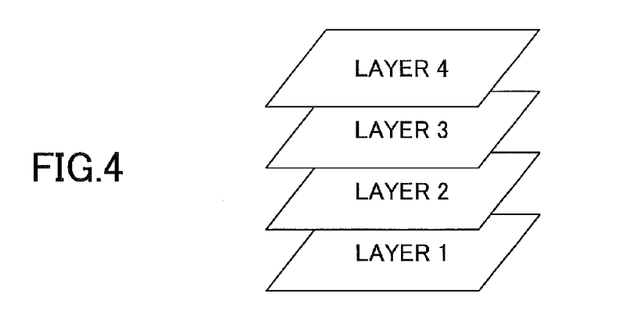
FIG. 4 illustrates an example of a layer structure.

First, a description is given of the layer structure of the operation unit 101 of the image processing device 100 according to the present embodiment. FIG. 4 illustrates an example of a layer structure. As illustrated in FIG. 4, the operation panel 215 of the operation unit 101 includes a plurality of layers for displaying various kinds of display information such as a GUI display screen and an error display screen. Among the layers, by superposing a higher-level layer (for example, layer 2) on a lower-level layer (for example, layer 1), it is possible to display a plurality of display information items in a superposed manner on the operation panel 215.

Furthermore, the respective layers included in the layer structure are used for different purposes. For example, layer 1 illustrated in FIG. 4 is used as a layer for displaying a GUI display screen of the application 415. Similarly, for example, layer 2 is used as a layer for displaying an authentication screen of the OS (not illustrated) of the operation unit 101. For example, layer 3 is used as a layer for displaying an alert display screen of the OS (not illustrated) of the operation unit 101, and layer 4 is used as a layer for displaying an error display screen of the OS (not illustrated) of the operation unit 101. As described above, on the operation panel 215, it is possible to display screens having a higher level of importance such as the alert display screen and the error display screen, in front of a GUI display screen of the application 415.

Figure 5:
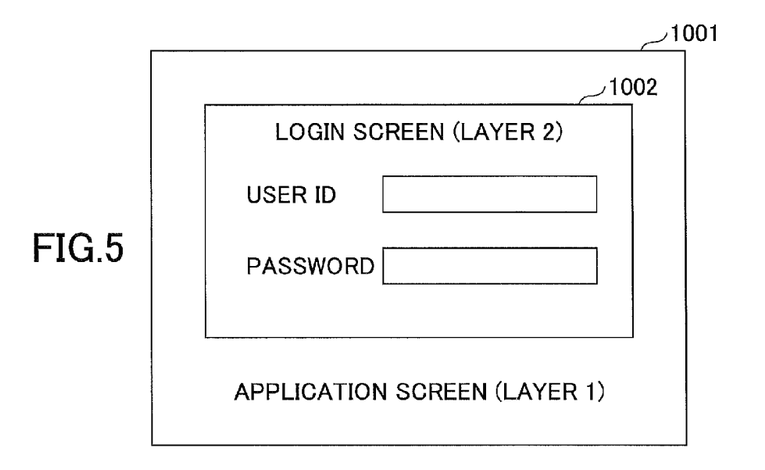
FIG. 5 illustrates an example of a screen displayed on the operation panel by using the layer structure.

A description is given of a screen displayed on the operation panel 215 of the operation unit 101 by using a layer structure as described above. FIG. 5 illustrates an example of a screen displayed on the operation panel by using the layer structure. As illustrated in FIG. 5, on the operation panel 215 of the operation unit 101, a login screen 1002 displayed on layer 2 is displayed by being superposed on an application screen 1001 (a GUI display screen of the application) displayed on layer 1. As described above, by using a layer structure to superpose a higher-level layer on a lower-level layer, it is possible to display a plurality of display screens (display information) on the operation panel 215 in a superposed manner.

<<Display Priority Level Management Table>>

Figure 6:
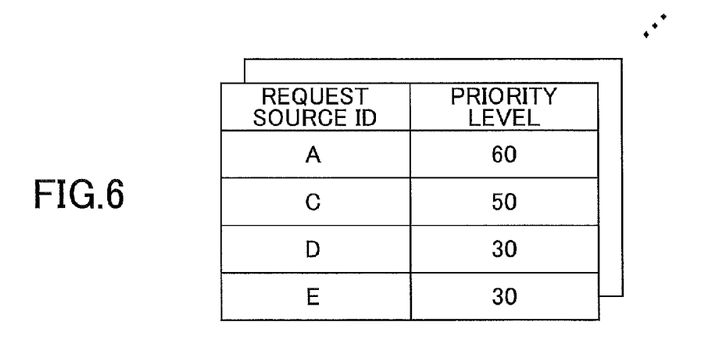
FIG. 6 illustrates an example of a configuration example of a display priority level management table.

Next, a description is given of a display priority level management table stored in the layer management unit 413 of the operation unit 101. The display priority level management table is stored in the layer management unit 413, for each layer included in the layer structure. FIG. 6 illustrates a configuration example of a display priority level management table. The display priority level management table is referred to by the display determining unit 412, and is used for determining the display information to be displayed in the same layer.

FIG. 6 indicates an example of a display priority level management table of layer 1. The display priority level management table of layer 1 includes a request source ID and a priority level. The request source ID is information for uniquely identifying the application 415 to make the display request. The priority level indicates the order of displaying these display requests. The first record in FIG. 6 indicates a request source ID "A" indicating information for uniquely identifying the application $415_1$, and a priority level "60" of the display request of this application $415_1$. Note that in the above description, the request source ID is information for uniquely identifying the application 415; however, the request source ID is not so limited, for example, the request source ID may be information for uniquely identifying a display request or display information (a job ID or an ID of a display screen), or information for uniquely identifying a service of the OS. Note that a display request is an example of a request to display information in one of the layers included in the layer structure. Furthermore, the request source ID is an example of information for identifying the request source.

Note that the above describes a display priority level management table of layer 1; however, the table configuration of the display priority level management table of other layers is the same as the above. That is to say, the display priority level management table for the other layers also includes a request source ID for identifying the application and the OS for making a display request to the corresponding layer, and a priority level, and the meanings of the respective data items are the same as described above. Note that the display priority level management table is an example of a predetermined storage area.

<Details of Process>

Next, a description is given of details of the process of the display function in the image processing device 100 according to the present embodiment. In the following, a description is given of a process of determining which display information of one of the display requests is to be displayed, when a display request is made for the same layer or a request to delete the display information presently being displayed is made, and displaying the display information on the operation panel 215. Note that in the following, a description is given of the above process performed with respect to layer 1 in which the display information of the application 415 is to be displayed. Note that the other layers may also be realized by the same process.

<<Display Process>>

Figure 7:
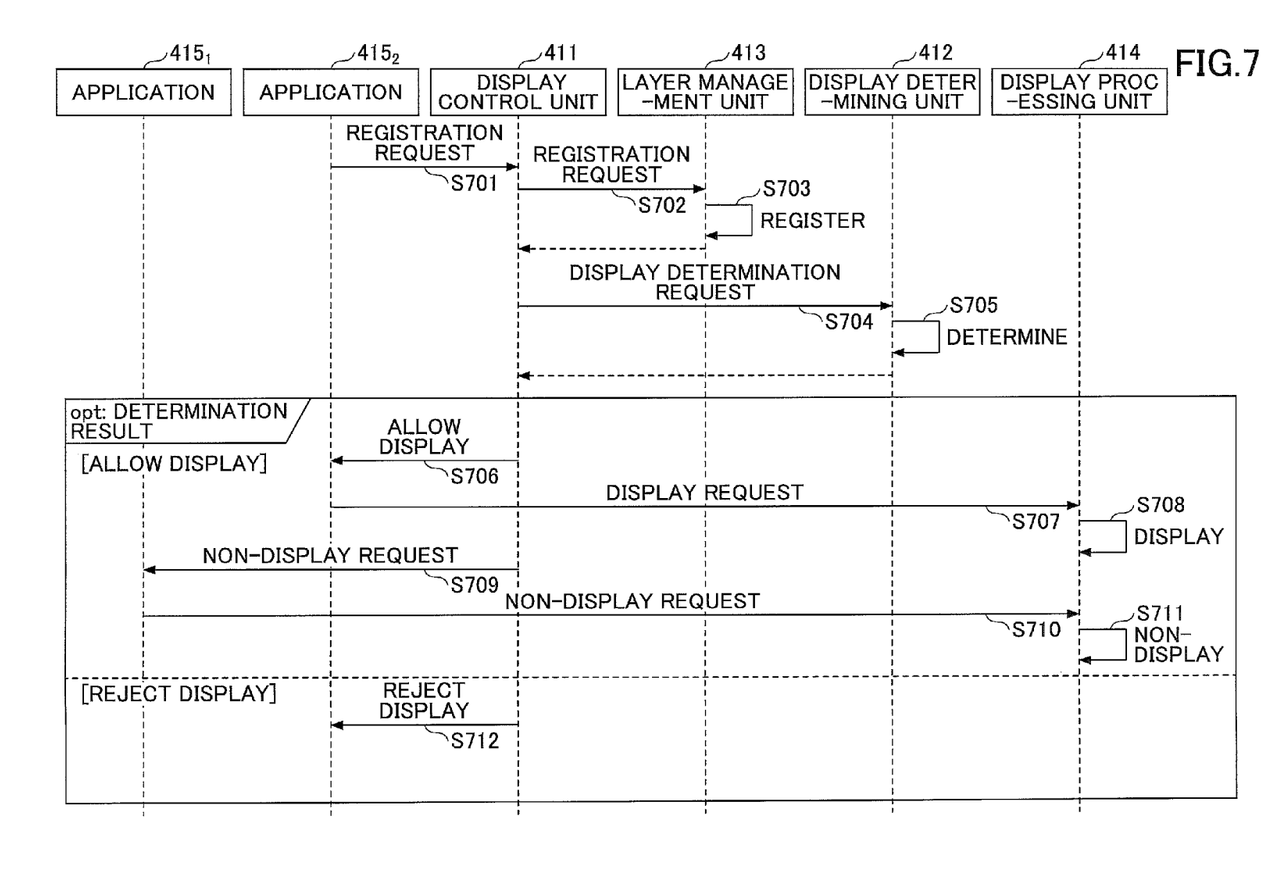
FIG. 7 is a sequence diagram indicating an example of a display process with respect to one of the layers according to an embodiment.

Next, with reference to FIG. 7, a description is given of a case where another application $415_2$ displays the display information of the application $415_2$, when the display information (for example, a GUI display screen) of the application $415_1$ is being displayed on the operation panel 215 of the operation unit 101. FIG. 7 is a sequence diagram indicating an example of a display process with respect to one of the layers according to the present embodiment.

First, the application $415_2$ sends, to the display control unit 411, information (request source ID) uniquely indicating the application $415_2$, and a request to register the priority level of the display request (step S701). Here, the priority level may be determined in advance for each application 415, or the priority level may be determined in advance for each display screen to be displayed on the operation panel 215 by the application 415.

Next, when the display control unit 411 receives a registration request from the application $415_2$, the display control unit 411 sends the registration request to the layer management unit 413 (step S702). When the layer management unit 413 receives the registration request from the display control unit 411, the layer management unit 413 stores the request source ID and the priority level in association with each other, in the display priority level management table of the corresponding layer (here, the display priority level management table of layer 1) (step S705). Then, the layer management unit 413 returns information indicating that the request source ID and the priority level have been stored, to the display control unit 411.

Here, the following description is given based on the assumption that in step S705, a request source ID "B" and a priority level "70" have be stored in the display priority level management table of layer 1, as information indicating the application $415_2$.

Next, the display control unit 411 requests the display determining unit 412 to determine whether to allow the application $415_2$ to display the display information on the operation panel 215 (that is to say, whether to allow the display request with respect to the display processing unit 414) (step S704). When the display determining unit 412 receives the above determination request from the display control unit 411, the display determining unit 412 refers to the display priority level management table of layer 1, and determines whether to allow the display request of the application $415_2$ with respect to the display processing unit 414 (step S705). That is to say, the display determining unit 412 refers to the corresponding display priority level management table, and determines which request source ID of an application 415 is to have the corresponding display information displayed on the corresponding layer (in this case, layer 1).

Here, the priority level of the application $415_2$ of the request source ID "B" is "70", whereas the priority level of the application $415_1$ (request source ID "A") presently displaying the display information on layer 1 is "60". Therefore, the priority level of the application $415_2$ is higher than that of the application $415_1$. Thus, the display determining unit 412 determines (display allowance determination) to allow the display request of the application $415_2$ with respect to the display processing unit 414. That is to say, the application 415 having a high priority level makes a display request with respect to the display processing unit 414, and causes the display processing unit 414 to display the display information in the corresponding layer. Accordingly, the display information relevant to the display request is displayed on the operation panel 215. In this case, the operation unit 101 performs the processes of steps S706 through S711 in FIG. 7.

Meanwhile, for example, when the priority level of the application $415_2$ of the request source ID "B" is less than the priority level of the application $415_1$ that is presently displaying the display information on layer 1, the display determining unit 412 determines (display rejection determination) to not allow the display request of the application $415_2$ with respect to the display processing unit 414. In this case, the operation unit 101 performs the process of step S712 of FIG. 7. At this time, the display information presently displayed on layer 1 continues to be displayed.

Note that, for example, when the priority level relevant to the registration request is the same as the priority level of the application 415 and the OS (not illustrated) presently displaying the display information in the same layer (in this case, layer 1), the display allowance determination may be made or a display rejection determination may be made for the application 415 that had made the registration request.

When the display control unit 411 receives information indicating the display allowance determination from the display determining unit 412, the display control unit 411 sends information indicating display allowance to the application $415_2$ (step S706).

Then, when the application $415_2$ receives information indicating the display allowance form the display control unit 411, the application $415_2$ makes a display request to the display processing unit 414 (step S707). That is to say, the application $415_2$ sends a display request including the display information to be displayed on the corresponding layer (layer 1), to the display processing unit 414.

When the display processing unit 414 receives the display request from the application $415_2$, the display processing unit 414 causes the corresponding layer (layer 1) to display the display information relevant to the display request (step S708). Accordingly, the display information such as a GUI display screen of the application $415_2$ is displayed on the operation panel 215 of the operation unit 101.

Next, the display control unit 411 makes a non-display request to the application $415_1$ (step S709). That is to say, the display control unit 411 makes a non-display request to not display (delete) the display information, to the application $415_1$ that is presently displaying the display information on layer 1. Then, when the application $415_1$ receives the non-display request from the display control unit 411, the application $415_1$ sends this non-display request to the display processing unit 414 (step S710), and the display processing unit 414 deletes (hides) the display information of the application $415_1$ from the corresponding layer (layer 1) (step S711).

Note that in the above process, after the process of step S708, the display information of the application $415_2$ is displayed on the operation panel 215 of the operation unit 101. Therefore, the processes of steps S709 through S711 do not necessarily need to be performed; however, by performing steps S709 through S711, it is possible to explicitly set the non-display of the display information of the application $415_1$, with respect to the application $415_1$ and the display processing unit 414.

Meanwhile, when the display determining unit 412 makes a display rejection determination in the process of step S705, the display control unit 411 sends information indicating display rejection to the application $415_2$ (step S712). Therefore, the display information of the application $415_2$ is not displayed on the corresponding layer (layer 1). That is to say, on the operation panel 215 of the operation unit 101, the display information of the application $415_1$ that is presently being displayed is continued to be displayed.

According to the above, the image processing device 100 and the operation unit 101 of the image processing device 100 according to the present embodiment are able to control the display with respect to the same layer included in a layer structure. For example, by setting priority levels among the applications 415 for displaying the display information on the same layer, it is possible to implement control to prioritize the display of display information of an application 415, according to the priority levels. Therefore, in the same layer, control is implemented to display the display information from an application 415 having a higher priority level than the application 415 that is presently displaying the display information, but not to display the display information from an application 415 having a lower priority level than the application 415 that is presently displaying the display information. Accordingly, when the number of layers included in a layer structure is limited (for example, in a case where the number of layers included in the layer structure cannot be increased), display control can be implemented in displaying information in the same layer.

<<Display Deletion Process>>

Figure 8:
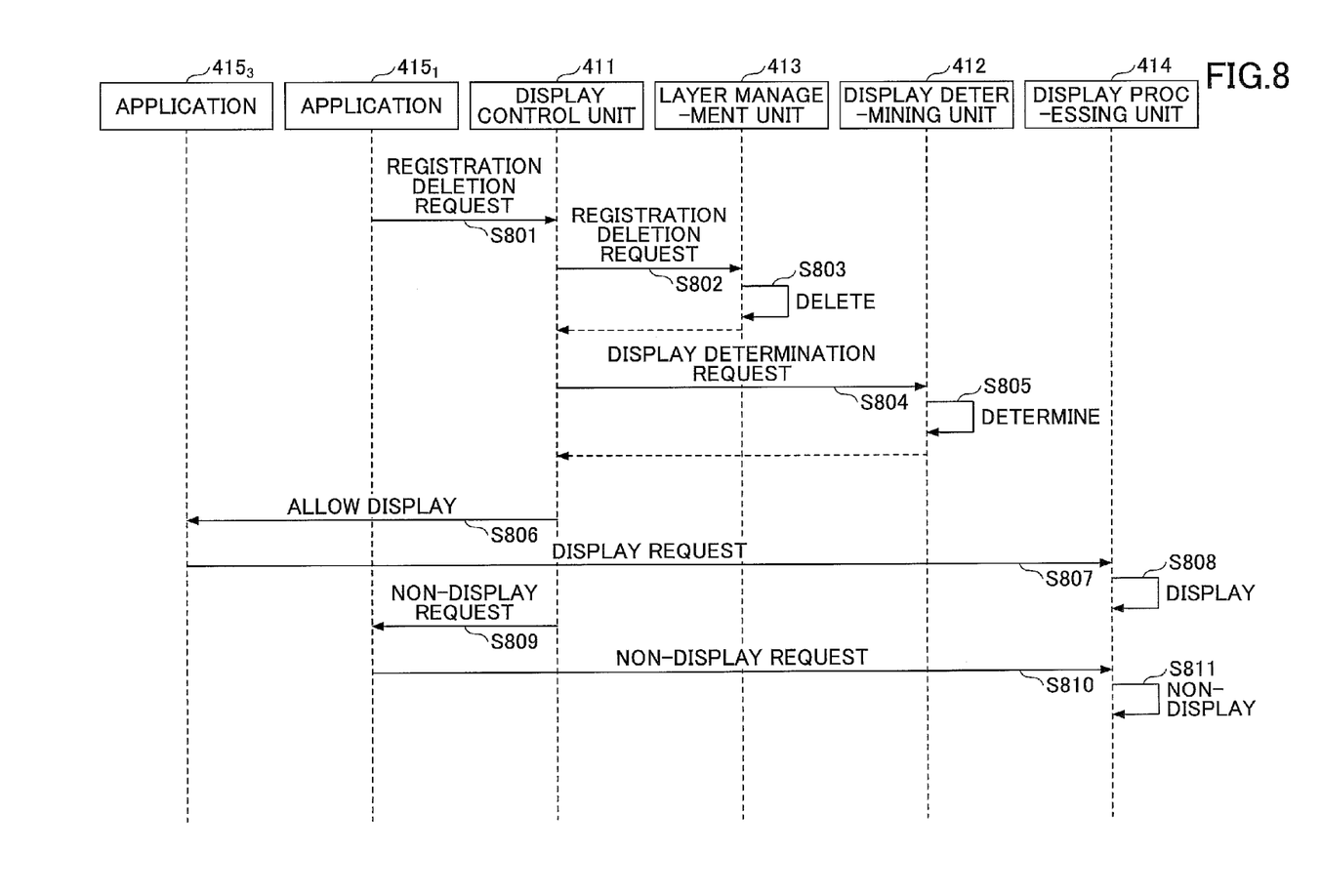
FIG. 8 is a sequence diagram indicating an example of a display deletion process with respect to one of the layers according to an embodiment.

Next, with reference to FIG. 8, a description is given of a process of deleting (hiding) the display information, in a case where the display information of the application $415_1$ is displayed on the operation panel 215 of the operation unit 101. FIG. 8 is a sequence diagram indicating an example of a display deletion process with respect to one of the layers according to the present embodiment.

First, the application $415_1$ sends, to the display control unit 411, a registration deletion request including information (request source ID) uniquely indicating the application $415_1$ (step S801).

Next, when the display control unit 411 receives a registration deletion request from the application $415_1$, the display control unit 411 sends this registration deletion request to the layer management unit 413 (step S802). When the layer management unit 413 receives the registration deletion request from the display control unit 411, the layer management unit 413 deletes the record of the corresponding request source ID from the display priority level management table of the corresponding layer (here, the display priority level management table of layer 1) (step S803). Here, the layer management unit 413 deletes a record of the request source ID "A" indicating the application $415_1$, from the display priority level management table of layer 1. Then, the layer management unit 413 returns, to the display control unit 411, information indicating that the record of the corresponding request source ID has been deleted.

Next, the display control unit 411 requests the display determining unit 412 to determine which application 415 is to display the display information on the corresponding layer (in this case, layer 1) (step S804). When the display determining unit 412 receives the determination request from the display control unit 411, the display determining unit 412 refers to the corresponding display priority level management table of layer 1 and determines which application 415 is to display the display information on layer 1 (step S805). That is to say, the display determining unit 412 refers to the display priority level management table of layer 1, determines which record has the highest priority level, and determines to display the display information of the application 415 corresponding to the request source ID of the highest priority. Then, the display determining unit 412 returns the determination result to the display control unit 411. Here, a description is given based on the assumption that the priority level "60" of the record of the request source ID "C" indicating the application $415_3$ is the highest priority level. That is to say, a description is given based on the assumption that the display determining unit 412 has returned the request source ID "C" as the determination result, to the display control unit 411.

Next, when the display control unit 411 receives the determination result from the display determining unit 412, the display control unit 411 sends information indicating display allowance to the corresponding application 415 (step S806).

Then, when the application $415_3$ receives the information indicating display allowance from the display control unit 411, the application $415_3$ makes a display request to the display processing unit 414 (step S807). That is to say, the application $415_3$ sends, to the display processing unit 414, a display request including the display information to be displayed on the corresponding layer (layer 1).

When the display processing unit 414 receives the display request from the application $415_3$, the display processing unit 414 causes the corresponding layer (layer 1) to display the display information corresponding to the display request (step S808). Accordingly, the display information such as a GUI display screen of the application $415_3$ is displayed on the operation panel 215 of the operation unit 101.

Next, the display control unit 411 makes a non-display request to the application $415_1$ (step S809). That is to say, the display control unit 411 makes a non-display request to not display (delete) the display information, to the application $415_1$ that is presently displaying the display information on layer 1. Then, when the application $415_1$ receives the non-display request from the display control unit 411, the application $415_1$ sends this non-display request to the display processing unit 414 (step S810), and the display processing unit 414 deletes (hides) the display information of the application $415_1$ from the corresponding layer (layer 1) (step S811).

Note that in the above process, after the process of step S808, the display information of the application $415_3$ is displayed on the operation panel 215 of the operation unit 101. Therefore, the processes of steps S809 through S811 do not necessarily need to be performed; however, by performing steps S809 through S811, it is possible to explicitly set the non-display of the display information of the application $415_1$, with respect to the application $415_1$ and the display processing unit 414.

Note that in step S803 above, when there is no record included in the display priority level management table as a result of deleting the record relevant to the registration deletion request from the corresponding display priority level management table, the processes of steps S806 through S811 are not performed. In this case, the display information is not displayed on the corresponding layer (layer 1).

According to the above, the image processing device 100 and the operation unit 101 of the image processing device 100 according to the present embodiment are able to control the display with respect to the same layer included in a layer structure. For example, when the display information presently displayed on one layer is deleted, reference is made to the display priority level management table of this layer, and control is implemented to determine which display information of one of the request source IDs of the applications 415 is to be displayed, based on the priority level. Therefore, in one layer, when the display information of the application 415 presently being displayed is deleted, the display information of the application 415 of the request source ID having the next highest priority level is displayed in this layer.

Accordingly, when the number of layers included in a layer structure is limited (for example, in a case where the number of layers included in the layer structure cannot be increased), display control can be implemented in displaying information in the same layer.

OVERVIEW

As described above, the image processing device 100 and the operation unit 101 of the image processing device 100 according to the present embodiment are able to control the display with respect to the same layer included in a layer structure, based on the priority level of the application, the OS, the service, etc., that displays the information on this layer. Therefore, without changing the layer structure, it is possible to control which display information is to be displayed in the same layer.

Note that in the present embodiment, the layer management unit 413 is an example of a storage unit and a deletion unit. The display determining unit 412 is an example of a determining unit. The display processing unit 414 is an example of a display unit.

According to one embodiment of the present invention, an information processing device and an information processing method are provided, which are capable controlling the display of a plurality of display information items based on priority levels.

The information processing device and the information processing method are not limited to the specific embodiments described herein, and variations and modifications may be made without departing from the spirit and scope of the present invention.

The present application is based on and claims the benefit of priority of Japanese Priority Patent Application No. 2014-065523, filed on Mar. 27, 2014, the entire contents of which are hereby incorporated herein by reference.

What is claimed is:

1. An information processing device including a hierarchical multilayer structure including a plurality of layers for displaying display information in a superposed manner, the information processing device comprising:
  memory storing computer-readable instructions; and
  one or more processors configured to execute the computer-readable instructions such that the one or more processors are configured to perform operations including, storing, in a predetermined storage area, a priority level included in a request, when the request to display the display information in one of the plurality of layers included in the hierarchical multilayer layer structure is received;

determining an order of displaying images within a single layer and determining whether to display, on the one of the layers, the display information corresponding to the request, based on the priority level stored in the predetermined storage area; and displaying the display information on the one of the layers, when the determining unit determines to display, on the one of the layers, the display information corresponding to the request.

2. The information processing device according to claim 1, wherein the one or more processors are configured to delete display information that is presently being displayed on the one of the layers, when determining to display, on the one of the layers, the display information corresponding to the request.

3. The information processing device according to claim 1, wherein the one or more processors are configured to determine whether to display, on the one of the layers, the display information corresponding to the request, according to how high the priority level stored in the predetermined storage area is.

4. The information processing device according to claim 1, wherein the one or more processors are configured to delete, from the predetermined storage area, the priority level included in the request, when a deletion request to delete the display information from the one of the layers is received, and select one of a plurality of priority levels stored in the predetermined storage area, and determine to display, on the one of the layers, the display information corresponding to the request corresponding to the selected one of the priority levels, based on the priority levels stored in the predetermined storage area after deleting the priority level, and display, on the one of the layers, the display information, which corresponds to the request corresponding to the selected one of the priority levels and which is determined to be displayed on the one of the layers.

5. The information processing device according to claim 1, wherein the predetermined storage area stores, for each of the layers included in the layer structure, information for identifying a request source of the request to display the display information in a same one of the layers and a priority level of the request source, in association with each other.

6. An information processing method performed by an information processing device including a hierarchical multilayer structure including a plurality of layers for displaying display information, the information processing method comprising:

storing, in a predetermined storage area, a priority level included in a request, when the request to display the display information in one of the plurality of layers included in the hierarchical multilayer layer structure is received;

determining an order of displaying images within a single layer and whether to display, on the one of the layers, the display information corresponding to the request, based on the priority level stored in the predetermined storage area; and displaying the display information on the one of the layers, when the display information corresponding to the request is determined to be displayed on the one of the layers at the determining.

7. A non-transitory computer-readable recording medium storing a program implementing an information processing device including a hierarchical multilayer layer structure including a plurality of layers for displaying display information in a superposed manner, wherein the program causes a computer to execute a process comprising:

storing, in a predetermined storage area, a priority level included in a request, when the request to display the display information in one of the plurality of layers included in the hierarchical multilayer layer structure is received;

determining an order of displaying images within a single layer and whether to display, on the one of the layers, the display information corresponding to the request, based on the priority level stored in the predetermined storage area; and displaying the display information on the one of the layers, when the display information corresponding to the request is determined to be displayed on the one of the layers at the determining.

* * * * *